Aug. 19, 1952　　　A. J. GRANBERG　　　2,607,224
FLUID METER TEMPERATURE COMPENSATING MEANS
Filed July 7, 1947　　　　　　　　　　　　　　3 Sheets-Sheet 1

INVENTOR.
ALBERT J. GRANBERG
BY
Bruce & Brosler
HIS ATTORNEYS

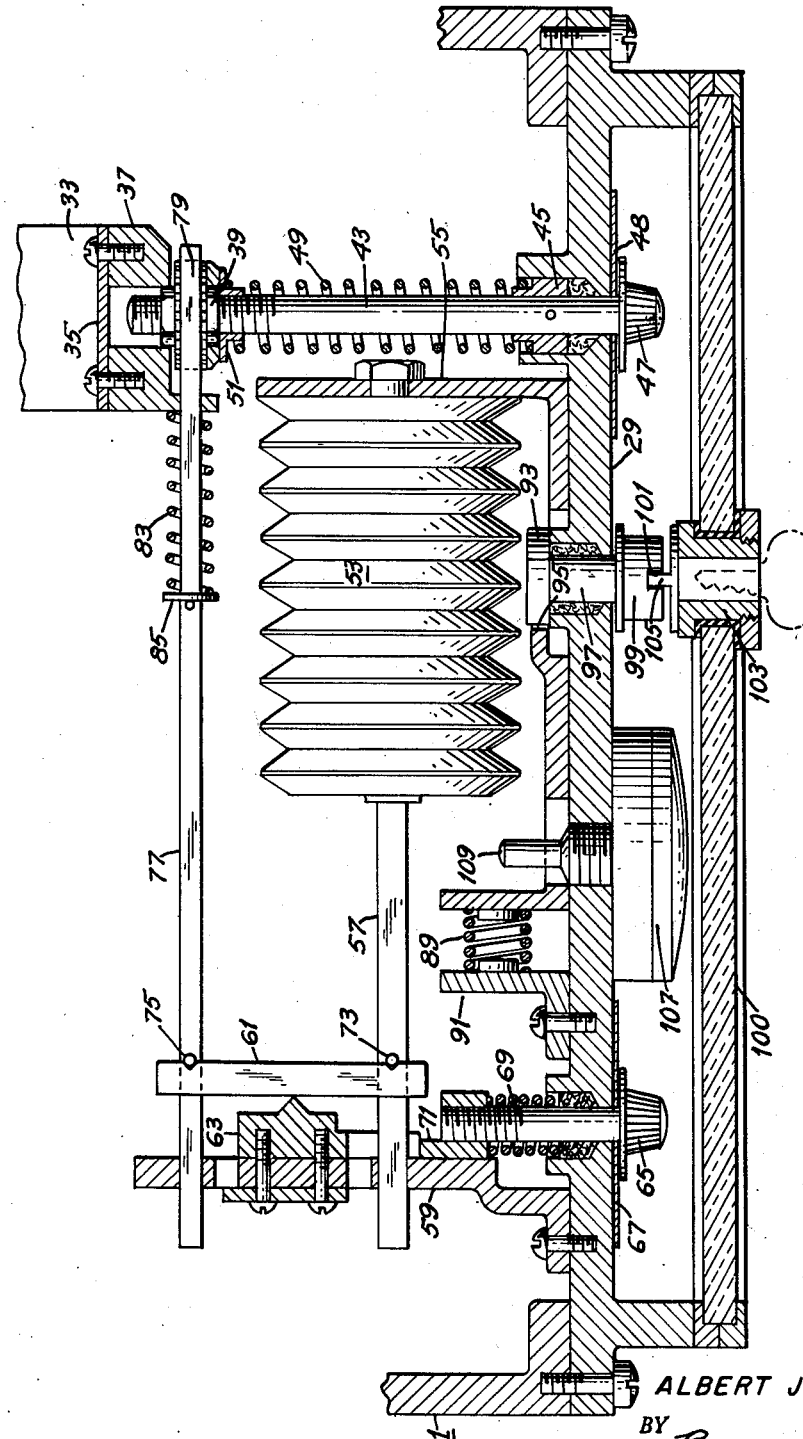

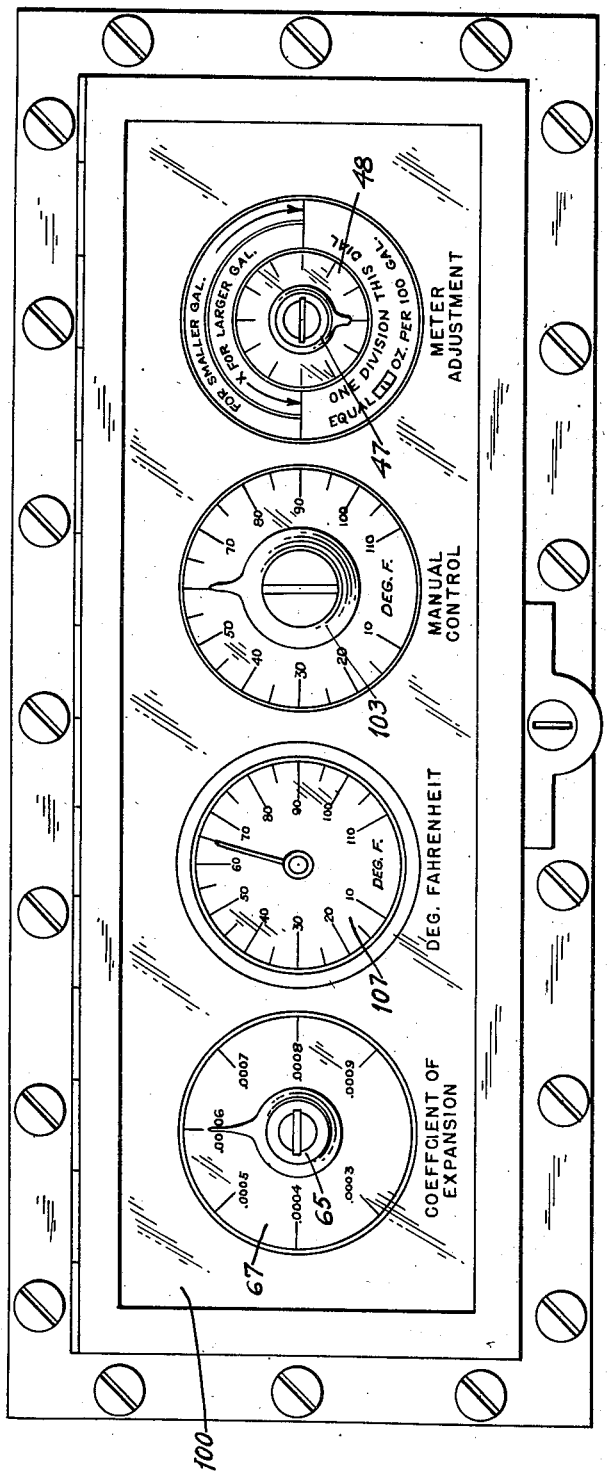
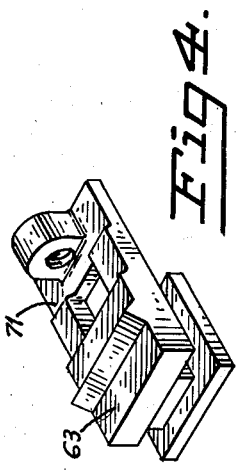

Patented Aug. 19, 1952

2,607,224

UNITED STATES PATENT OFFICE 2,607,224

FLUID METER TEMPERATURE COMPENSATING MEANS

Albert J. Granberg, Oakland, Calif.

Application July 7, 1947, Serial No. 759,384

4 Claims. (Cl. 73—253)

My invention relates to the dispensing of fluids, and more particularly to the metering of fluids which are subject to appreciable volumetric changes with variations in temperature.

Many commercially handled fluids have an appreciable coefficient of expansion, and meters utilized in measuring such fluids give readings in terms of the unit volume of the fluid at the existing temperature. Consequently, if discrepancies are to be avoided, when such a fluid is purchased at one temperature and sold at another, the volume of such fluid must be calculated back to a predetermined temperature basis.

Thus, according to one practice, a 12,000 gallon tank car of gasoline, for example, filled at 70° Fahrenheit, will register on the meter as 12,000 gallons, but will be invoiced at 11,928 gallons, which would be its volume at 60° Fahrenheit, this latter temperature being taken as the reference temperature. This figure is obtained by subtracting from the meter reading (12,000 gallons), the value obtained by multiplying the meter reading by the coefficient of expansion of gasoline (.0006 gallon per degree rise) times the change in temperature (10°).

Among the objects of my invention are:

(1) To provide a novel and improved fluid metering means;

(2) To provide a novel and improved metering means for measuring a fluid in terms of its volume at other than its existing temperature;

(3) To provide a novel and improved fluid metering means adapted to automatically compensate for volumetric changes in the fluid, occasioned by changes in temperature;

(4) To provide a novel and improved fluid metering means capable of adjustment to measure fluids having different coefficients of expansion.

Additional objects of my invention will be brought out in the following description of a preferred embodiment of the same, taken in conjunction with the accompanying drawings wherein—

Figure 2 is a view in section through the temperature compensating portion of the meter;

Figure 3 is a front elevational view of the meter control panel;

Figure 4 is a view depicting a structural detail of the temperature compensating portion of the meter.

Figure 1:
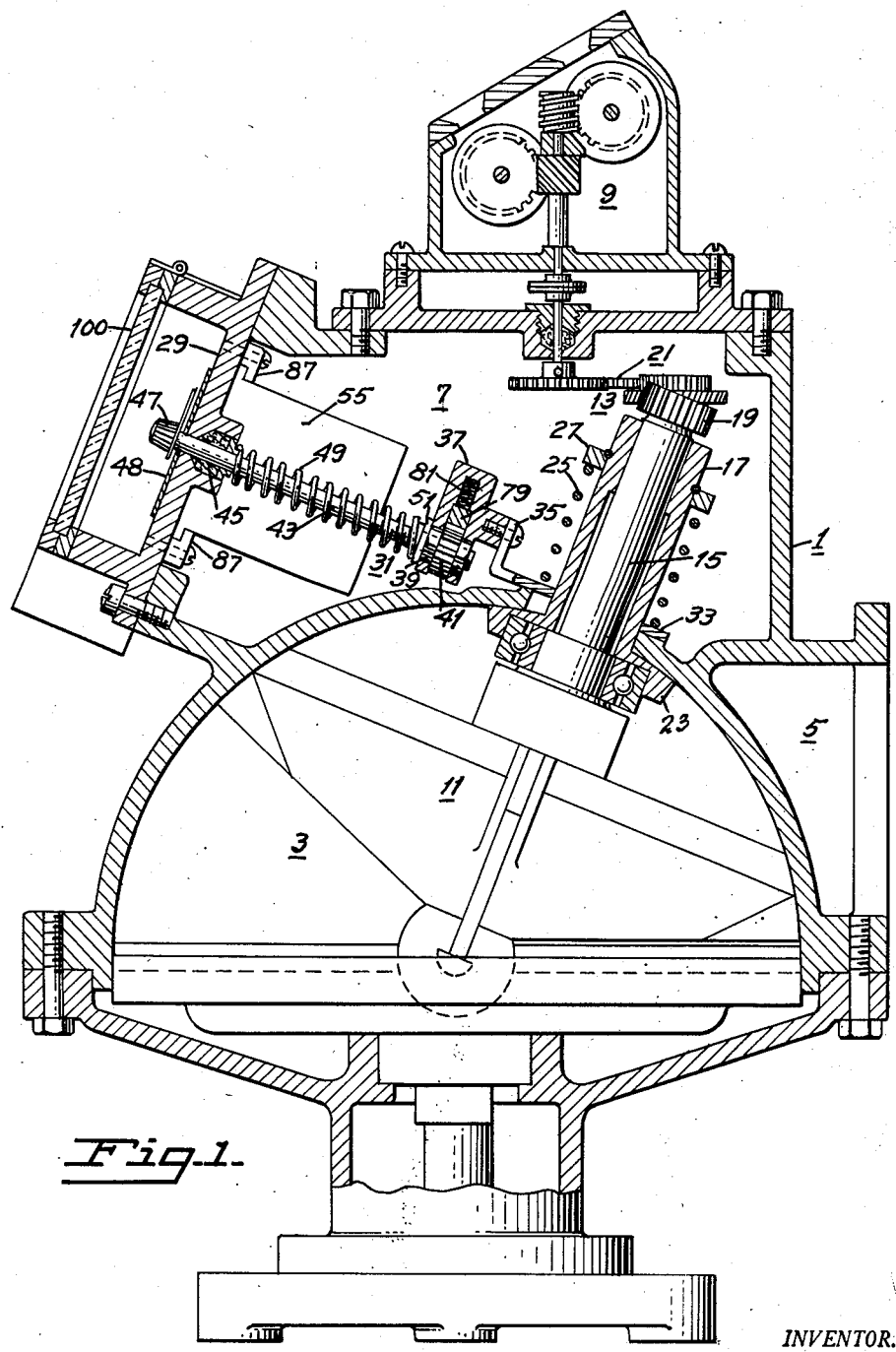
Figure 1 is a view in section through a meter embodying the present invention.

The invention is capable of being embodied in many different types of meters, but for purposes of illustration, is herein incorporated in a type of meter comprising a casing 1 formed to provide a substantially hemispherical metering chamber 3 and an inlet passage 5 to said metering chamber by way of an upper chamber 7.

A counter 9, mounted on top of the casing, responds to the action of a rotor 11 in the meter chamber to record volume of fluid passing through the meter in terms of gallons. Such response is realized by a drive connection 13 between the rotor and the counter, which drive connection involves a stub shaft 15 extending from the rotor through the wall of the metering chamber into the upper chamber by way of a sleeve bearing 17 and carrying at its end a pinion 19 in mesh with a gear train 21 leading to the counter.

The sleeve bearing passes through an oversized opening in the metering chamber wall and is formed with a flange 23 at its inner end in a complementary fit with the wall surface of the chamber, to permit of a limited shifting of the rotor, whereby to vary the volumetric calibration of the meter. The shape of the opening is immaterial, just so long as it permits of the limited shifting of the rotor. The snug fit between the sleeve flange and the inner surface of the meter chamber wall is maintained by a coil spring 25 about the sleeve and maintained under compression by a stop washer 27 surrounding the sleeve and affixed thereto as by welding or by a snap ring.

The upper chamber in the casing is closed off at the front of the meter by a panel 29 which supports one end of a manual control 31 for altering the volumetric calibration of the meter through adjustment of the rotor position in the metering chamber.

Such manual control includes a ring 33 closely fitting about the sleeve and held in position against the outer surface of the metering chamber wall by the compression spring 25. The ring is formed with an upturned flange 35 to which is affixed a nut housing 37. This housing encloses a nut 39, the intermediate portion of which is of an enlarged diameter and formed with peripheral teeth to constitute a pinion 41. A threaded control rod 43 passing through a packing gland 45 in the panel, threadedly engages this nut, and at its panel end, carries a control knob 47 backed up by a dial 48. A compression spring 49 between an abutment washer 51 adjacent the nut housing and the packing gland, serves to hold the packing under compression and at the same time holds the control knob against movement away from the panel, whereby manipulations of the knob will necessarily cause the nut to run up or down the control rod and thereby change the volumetric calibration of the meter.

As thus far described, the meter, when properly adjusted for accuracy at the existing temperature as by manipulations of the control knob 47, will not take into account volume changes in fluid occasioned by changes in temperature from such previous prevailing or reference temperature.

To compensate for changes in temperature so as to maintain a meter reading rate with respect to a predetermined temperature for which the meter may have been initially adjusted, I provide means for altering the volumetric characteristic of the meter in accordance with volumetric changes in the fluid, induced by such temperature changes.

Toward this end, there is provided a bellows 53, preferably of the "Sylphon" bellows type, anchored at one end to a support 55, leaving its other end free to move in response to expansion and contraction brought on by changes in temperature.

From the free end of the bellows there extends a rod 57 which is slidably mounted in a bracket 59 extending out from the rear surface of the panel 29.

Movements of the bellows occasioned by changes in temperature are translated into changes in the volumetric adjustment of the meter by causing the same to act upon one end of a balance bar 61 which is fulcrumed against a fulcrum block 63 mounted on the bracket 59, the other end of the balance bar in turn acting against means for effecting changes in the meter adjustment.

The fulcrum block 63 is preferably slidably mounted on the bracket under control of an adjusting knob 65 backed up by a dial 67 carried on the panel, the adjusting knob having a shank 69 threadedly engaging an extension 71 of the fulcrum block whereby rotation of the knob may be translated into a shifting of the fulcrum block within desired limits.

The bellows rod 57 carries a pin 73 which engages in a notch at one end of the balance bar, while at the other end of the balance bar, a corresponding notch permits the bar to positively engage a pin 75 in a similar rod 77 slidably supported at one end in the bracket 59, and at its other end, terminating in a rack 79 which passes through the nut housing to mesh with the pinion 41.

The rack is resiliently maintained in mesh with the pinion by a small compression spring 81 within the nut housing and bearing against the rack, and is further stabilized by a coil spring 83 surrounding the rod and held under compression between the nut housing and a stop washer 85 affixed about the rod at an intermediate point thereon.

Expansion or contraction of the bellows, reacting through the balance bar, will cause corresponding movements of the rack, which in turn will rotate the pinion and produce a change in the volumetric adjustment of the meter. Inasmuch as fluids such as gasoline, oil, etc. have linear expansion characteristics, it is important, from the viewpoint of accuracy, that the bellows also have such characteristic, and to assure this, the bellows is preferably filled with any liquid having a linear expansion characteristic. Alcohol is suggested as an ideal liquid for this purpose since it is non-corrosive, will withstand low temperatures without freezing, and will not age with time.

Since the coefficient of expansion of the liquid in the bellows may not coincide with that of the fluid to be metered, the location of the fulcrum block may be adjusted to compensate for this difference, whereby the resulting variations in the volumetric adjustment of the meter will agree with that of the liquid being metered and not with that of the fluid in the bellows. The ability to shift the fulcrum block for this purpose permits of the associated dial 67 being pre-calibrated in terms of the coefficient of expansion for different fluids, whereby the meter may be adjusted to temperature compensate for such fluids having different coefficients of expansion.

Once the meter has been adjusted to read accurately at a given temperature and with the fulcrum block properly adjusted in accordance with the coefficient of expansion of the fluid to be metered, the temperature changes induced in the bellows by the fluid flowing in temperature transfer contact therewith, will cause the meter to hold to the particular reading rate, characteristic of the temperature for which it was initially set.

In order to enable the meter to be adjusted so as to give a reading rate, characteristic of some other reference temperature, the support 55 to which the bellows is affixed is made adjustable. And by making it adjustable, the volumetric characteristic of the meter may be so altered that at the reference temperature, the meter will measure a full gallon of the fluid for each gallon indication on the counter.

Starting out with such an adjustment, the meter will thereafter record on the counter an output which would be recorded at the reference temperature.

Accordingly, with this in mind, the support for the bellows may take the form of a bracket slidably mounted between guides 87 on the rear of the panel. Such bracket is biased in one direction of movement by a compression spring 89 disposed between one end of the bracket which is flanged for the purpose, and a flanged stop 91 bolted to the rear of the panel. Adjustment of the initial position of the bellows is against the action of this compression spring by means of a manually controllable cam 93 disposed in an opening through the base of the bracket in contact with an offset edge 95 of such opening.

The cam is provided with a shank 97 passing through a packing gland in the panel and terminating in a knob 99.

Inasmuch as any particular meter when once adjusted to meter a particular fluid, will require no further adjustment other than possibly to alter the reference temperature of the meter, I prefer to protect the panel controls against unauthorized tampering, by applying thereover a hinged glass cover 100, capable of being locked.

To make it possible under these conditions to adjust for reference temperature of the meter, I prefer to provide the control knob with a diametrical groove 101 while in the glass cover I mount a key-controlled lock 103 having at its inner end a tongue 105 capable of meshing with the groove in the knob, with the glass cover in position.

Thus the meter may be adjusted to a desired reference temperature with the glass cover in position over the panel, and the necessity of utilizing a key to make adjustment, precludes unauthorized tampering with this adjustment.

Should it be desired to restore the meter for normal operation at a prevailing temperature in which case no temperature compensation occurs, all that is necessary is to adjust the reference temperature of the meter to correspond with the prevailing temperature. To facilitate making this adjustment, I mount on the panel, a dial thermometer 107 whose temperature responsive element 109 extends into the flow path of the fluid passing through the meter, whereby the thermometer will indicate the temperature of the fluid, since it is the temperature of this fluid as it passes through the meter, which determines the temperature compensation of the meter.

The fact that all adjustments and controls work against spring compression, is an important feature of the invention, in that lost motion is eliminated in the operation thereof, thus assuring a high degree of accuracy in the results obtained.

From the above description of my invention in its preferred form, it will be apparent that the same fulfills all the objects of my invention as originally set forth, and while I have described this preferred embodiment in considerable detail, the same is subject to alteration and modification without departing from the underlying principles of the invention, and I, accordingly, do not desire to be limited in my protection to the specific details illustrated and described, except as may be necessitated by the appended claims.

I claim:

1. For use with a fluid meter having an adjustable volumetric capacity and a volume calibration adjustment for altering said volumetric capacity, means responsive to temperature changes for automatically altering said adjustment substantially linearly per degree change in temperature to maintain a meter reading rate relative to a predetermined reference temperature, said means including a bellows anchored at one end, means for coupling said bellows at its other end in movement transfer relationship to said volume calibration adjustment, said coupling means embodying a balance bar, a fulcrum block adjustably engaging said balance bar at an intermediate point thereof, a rod extending between said bellows and one end of said balance bar, and a rod extending between the other end of said balance bar and said volume calibration adjustment; means for guiding fluid to be metered, into temperature transfer contact with said first means whereby said first means will respond to changes in temperature of said fluid; means for varying the meter reading rate to accord with a different reference temperature, said means including a panel, a bracket slidably mounted on said panel and to which said bellows is anchored, and means for shifting said bracket and bellows to alter said volume calibration adjustment to a reference position representative of the desired reference temperature; means for modifying the temperature response rate of said temperature responsive means to accord with the coefficient of expansion of the fluid to be metered, said means including a control on said panel adapted to shift the position of said fulcrum block with respect to said balance arm; a transparent cover over said panel; and a key-operated control mounted in said cover and having interlocking engagement with said means for shifting the bracket and bellows.

2. In a fluid meter having a means enabling alteration of the relationship between the actual output of the meter and the indication of such output, a panel, a bellows support, means slidably mounting said support on the rear side of said panel, spring means normally urging said bellows support toward one end of the permissible movement thereof, a temperature-responsive bellows affixed at one end thereof to said support in the flow path of liquid to be metered, means coupling the opposite end of said bellows in an operating connection to said relation-altering means to alter the adjustment thereof in response to temperature expansion and contraction of said bellows, a cam rotatably mounted on the rear side of said panel in camming engagement with said support, said cam including a shaft passing through said panel, and means for rotatably adjusting said cam to effect shifting of said support and bellows in opposition to said spring means, said cam rotating adjusting means including a knob at the end of said shaft on the front side of said panel, a window supported over said knob, a key controlled lock mounted in said window in line with said knob, and a tongue and groove connection coupling said key controlled lock and said knob.

3. In a fluid meter having means enabling alteration of the relationship between the actual output of the meter and the indication of such output, a panel, a temperature-responsive bellows, means supporting said bellows at one end thereof behind said panel in the flow path of liquid to be metered, with the longitudinal axis of said bellows substantially paralleling said panel, a balance bar, a bracket extending from the rear of said panel normal thereto; a fulcrum block slidably mounted on said bracket and engaging said balance bar at an intermediate point thereof, a rod extending from the free end of said bellows and slidably supported at its remote end by said bracket, a pin on said rod engaging said balance bar to one side of said intermediate point of engagement of said fulcrum block, a rod extending from said relation altering means and also slidably supported at its remote end by said bracket, a pin on said rod engaging said balance bar to the other side of said intermediate point, and means for shifting said fulcrum block to alter said intermediate point of engagement.

4. In a fluid meter having means enabling alteration of the relationship between the actual output of the meter and the indication of such output, a panel, a temperature-responsive bellows, means supporting said bellows at one end thereof behind said panel in the flow path of liquid to be metered, with the longitudinal axis of said bellows substantially paralleling said panel, a balance bar, a bracket extending from the rear of said panel normal thereto; a fulcrum block slidably mounted on said bracket and engaging said balance bar at an intermediate point thereof, a rod extending from the free end of said bellows and slidably supported at its remote end by said bracket, a pin on said rod engaging said balance bar to one side of said intermediate point of engagement of said fulcrum block, a rod extending from said relation altering means and also slidably supported at its remote end by said bracket, a pin on said rod engaging said balance bar to the other side of said intermediate point, and means for shifting said fulcrum block to alter said intermediate point of engagement, said means including an adjusting knob on the front of said panel and having a shank passing through said panel and threadedly coupling with said fulcrum block.

ALBERT J. GRANBERG.

REFERENCES CITED

The following references are of record in the file of this patent:

UNITED STATES PATENTS

| Number | Name | Date |
|---|---|---|
| 1,506,683 | Staaf | Aug. 26, 1924 |
| 2,095,522 | Hejduk et al. | Oct. 12, 1937 |
| 2,151,201 | Griffith | Mar. 21, 1939 |
| 2,208,687 | Renfrew | July 23, 1940 |
| 2,283,532 | Brubaker et al. | May 19, 1942 |
| 2,286,411 | Hazard | June 16, 1942 |
| 2,366,330 | Griffith et al. | Jan. 2, 1945 |
| 2,414,596 | Griffith et al. | Jan. 21, 1947 |